United States Patent
Jammer et al.

(10) Patent No.: US 6,520,042 B2
(45) Date of Patent: *Feb. 18, 2003

(54) ELECTRIC POWER STEERING ASSIST MECHANISM

(75) Inventors: Todd Fredrick Jammer, Birch Run; Suat Ali Ozsoylu, Saginaw; Troy P Strieter, Sebewaing, all of MI (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/414,237

(22) Filed: Oct. 7, 1999

(65) Prior Publication Data

US 2002/0053249 A1 May 9, 2002

(51) Int. Cl.[7] .............................. F16H 1/16; B62D 5/04; F16C 27/06
(52) U.S. Cl. ........................ 74/425; 74/388 PS; 74/411; 74/440; 267/141
(58) Field of Search .................. 74/409, 425, 426, 74/427, 440, 388 PS; 384/536, 582; 188/184; 267/141, 136

(56) References Cited

U.S. PATENT DOCUMENTS

| | | | | | |
|---|---|---|---|---|---|
| 2,341,968 A | * | 2/1944 | West | ........................ | 74/427 X |
| 2,586,293 A | * | 2/1952 | Birkigt | ........................ | 74/425 |
| 2,656,182 A | * | 10/1953 | Willison | ................. | 267/136 X |
| 3,223,400 A | * | 12/1965 | Deister, Jr. | .............. | 267/136 X |
| 3,580,560 A | * | 5/1971 | Jarrett | ..................... | 267/136 X |
| 3,687,440 A | * | 8/1972 | Jarret et al. | ................. | 267/141 |
| 3,751,024 A | * | 8/1973 | Pineau | .................... | 267/136 X |
| 3,809,382 A | * | 5/1974 | Pamer | ........................ | 267/136 |
| 4,026,163 A | * | 5/1977 | Merkert | ....................... | 74/425 |
| 4,187,933 A | * | 2/1980 | Calabrese et al. | ......... | 74/89.14 |
| 4,771,989 A | * | 9/1988 | Smith | ...................... | 267/136 X |
| 4,885,948 A | * | 12/1989 | Thrasher, Jr. et al. | ...... | 74/89.14 |
| 5,090,261 A | * | 2/1992 | Nakatsukasa | ............... | 74/89.14 |
| 5,135,083 A | * | 8/1992 | Hayashi et al. | ............. | 188/184 |
| 5,280,889 A | * | 1/1994 | Amil et al. | ............. | 267/136 X |
| 5,777,411 A | * | 7/1998 | Nakajima et al. | ............. | 74/425 |
| 5,823,518 A | * | 10/1998 | Nagamitsu et al. | ..... | 267/136 X |
| 5,834,662 A | * | 11/1998 | Stoll et al. | .................... | 74/425 |
| 5,921,357 A | * | 7/1999 | Starkovich et al. | ..... | 267/136 X |
| 6,044,723 A | * | 4/2000 | Eda et al. | ............... | 74/388 PS |
| 6,079,698 A | * | 6/2000 | Patterson et al. | ....... | 267/136 X |

FOREIGN PATENT DOCUMENTS

DE 19822478 12/1998

OTHER PUBLICATIONS

Delphi Corporation, Value Engineering Workshop Seminar, Sep. 16–20, 1996, Electric Power Steering (EPS) By Y. Kouzaki, G. Hirose, S. Sekiya, Y. Miyaura, NSK Technical Journal No. 667 (1999).

Electric Power Steering (EPS) By Y. Kozaki, G. Hirose, S. Sekiya, Y. Miyaura, Motirion & Control No. 6, 1999.

* cited by examiner

Primary Examiner—David A. Bucci
Assistant Examiner—Colby Hansen
(74) Attorney, Agent, or Firm—Edmund P. Anderson

(57) ABSTRACT

A gear reduction mechanism includes a gearbox housing, a first gear having a first axis of rotation about a first shaft and the second gear having a second axis of rotation about a second shaft. The first and second gears are rotatably mounted in a gearbox housing so that the first and second gears mesh with each other such that the first axis of the first gear is substantially perpendicular to the second axis of the second gear. The gear isolator assembly is preferably disposed within the gearbox housing about the second gear for reducing noise generated between the first and second gears during operation of the mechanism.

19 Claims, 3 Drawing Sheets

ELECTRIC POWER STEERING ASSIST MECHANISM

CROSS-REFERENCE

The present application is related to copending U.S. patent application Ser. No. 09/414,239 filed Oct. 7, 1999 entitled "Electric Power Steering Assist Mechanism" in the name of Ozsoylu, et al. DP300416, the contents of which are incorporated by reference hereto.

TECHNICAL FIELD

This invention relates generally to a steering apparatus for a motor vehicle, more particularly, to be damped worm assist mechanism for reducing audible noise in an electric power steering assist mechanism.

BACKGROUND OF THE INVENTION

Presently, certain motor vehicles contain column-type power steering apparatus that employ an electric power steering assist mechanism. The electric power steering assist mechanism provides torque assist to the steering shaft of a vehicle via an electric motor and a worm/worm gear reduction mechanism. The worm/worm gear reduction gear reduction mechanism is interposed between the output shaft and the motor to obtain an appropriate steering speed as well as sufficient steering assistance in the course of transmission of the rotational force from the motor to the output shaft.

When the motor vehicle is operating, clearances between the worm and worm gear teeth and between other adjacent components in the mechanism commonly result in "rattle" noise. Road feedback forces and torques travel through the steering shaft to the worm gear. These vibration loads are transmitted through the worm gear to the worm. The oscillatory impact produced takes place where the worm and worm gear teeth mesh. This oscillatory impact translates into axial forces acting upon the worm. These axial forces react through the worm to the adjacent components and produce the resulting "rattle" noise.

There exists a need for a damped gear reduction mechanism that reduces the audible noise generated by the meshing of the gears.

SUMMARY OF THE INVENTION

This invention offers further advantages and alternatives over the prior art by providing a damped gear reduction mechanism, which reduces audible noise generated by the meshing of the gears. According to the present invention, a damped gear reduction mechanism is provided. The damped gear reduction mechanism preferably includes a gear isolator assembly for reducing noise generated by a first gear meshing with a second gear during operation of the mechanism.

In an exemplary embodiment, the first gear has a first axis of rotation about a first shaft and the second gear has a second axis of rotation about a second shaft. The first and second gears are rotatably mounted in a gearbox housing so that the first and second gears mesh with each other such that the first axis of the first gear is substantially perpendicular to the second axis of the second gear. The gear isolator assembly is preferably disposed within the gearbox housing about the second gear for reducing noise generated between the first and second gears during operation of the mechanism. More specifically, the first and second gears rotate about their respective axis during operation of the mechanism. It is this interaction between the first and second gears which generates noise, which travels through the gearbox housing.

In an exemplary embodiment, the gear isolator assembly comprises an elastomeric member having first and second planar surfaces and inner and outer surfaces. Each of the inner and outer surfaces includes a plurality of ridges, which define a plurality of grooves there between. The elastomeric member is disposed between first and second washers. An exemplary washer has an annular planar section formed between opposing flared edges. First and second planar surfaces of the elastomeric member seat within the planar sections of the first and second washers between the respective flared edges. The design of the first and second planar surfaces of the elastomeric member permits the elastomeric member to compress under pressure.

Advantageously, the present invention may also provide a damped gear assist mechanism that can reduce the audible noise generated by the meshing of the first and second gears.

Advantageously, the present invention may also provide a damped gear assist mechanism that can lower the combined stiffness of the mechanical system, which contributes to the reduction of audible noise generated by the meshing of the first and second gears.

Advantageously, the present invention may also provide a damped gear assist mechanism that can de-lash the ball bearing assemblies, which contributes to the reduction of audible noise generated by the meshing of the first and second gears.

The above-described and other features and advantages of the present invention will be appreciated and understood by those skilled in the art from the following detailed description, drawings, and appended claims.

BRIEF DESCRIPTION OF THE DRAWINGS

The present invention will now be described, by way of example, with reference to the accompanying drawings, in which.

DETAILED DESCRIPTION OF THE PRESENT INVENTION

Figure 1:
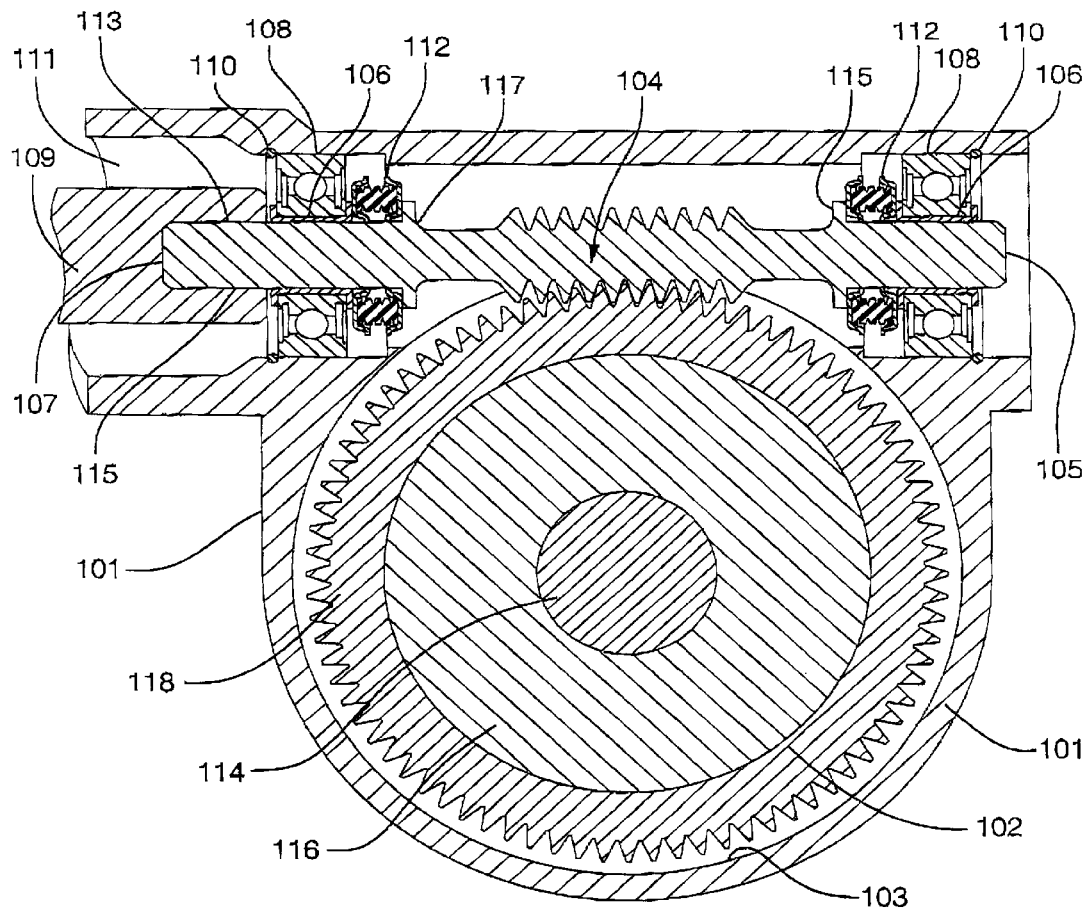
FIG. 1 is a cross-sectional view of an electric power steering assist mechanism including the worm isolator assembly embodying the present invention.

An electric power steering assist mechanism assembly utilizing the present invention is depicted in FIG. 1. Those skilled in the art will appreciate that worm/worm gear reduction mechanisms are vehicle application specific. For each vehicle a worm/worm gear reduction mechanism is manufactured to the specifications of that particular vehicle. Those skilled in the art will further appreciate that the present invention may be modified for use with many different vehicle applications.

Referring to FIG. 1, it is seen that a damped worm assist mechanism, generally indicated at 100, includes a gearbox housing 101, a worm gear 102, a worm 104, a pair of bushings 106, a pair of ball bearing assemblies 108, a pair of retaining rings 110 and a pair of worm isolator assemblies 112.

Worm gear 102 is disposed intermediate to an inner wall 103 of a gearbox housing 101 and steering shaft 114. Worm 104 is positioned within gearbox housing 101 by disposing a first end 105 and a second end 107 of worm 104 between bushings 106, ball bearing assemblies 108 and worm isolator assemblies 112. Second end 107 of worm 104 is coupled to an output shaft 109, which is connected to an electric motor that is not shown, so that the latter drives worm 104 when the electric motor is operating. In the illustrative embodiment, second end 107 is secured within an opening 111 of output shaft 109.

Worm gear 102 is rotatably mounted in gearbox housing 101 and rigidly connected to steering shaft 114. In the illustrated embodiment, worm gear 102 comprises an annular shaped gear. It will be appreciated that worm gear 102 may include teeth (not shown) formed on a surface thereof for a coupling component of worm gear 102. The exemplary worm gear 102 comprises an inner ring 116 coupled to an outer ring 118. Inner ring 116 and outer ring 118 may be coupled together by many known techniques or methods as are understood by those skilled in the art. This is by example only, as not all worm gears are comprised of two components. Worm gear 102 is also rotatably supported within gearbox housing 101.

Worm 104 is rotatably mounted in gearbox housing 101. The second end 107 of worm 104 being preferably connected directly to an output shaft 109. One exemplary worm 104 comprises an elongated shaft that crosses the length of gearbox housing and permits support on first and second ends 105, 107, respectively. Bushings 106 and ball bearing assemblies 108 also support worm 104 in gearbox housing 101. Bushings 106 and ball bearing assemblies 108 are held in gearbox housing 101 by annular retaining rings 110. Bushings 106 are preferably tubular shaped and are disposed about worm 104 to allow axial movement of the worm 104 with respect to ball bearing assemblies 108. Ball bearing assemblies 108 rotatably support worm 104 while remaining stationary against gearbox housing 101.

Figure 3:
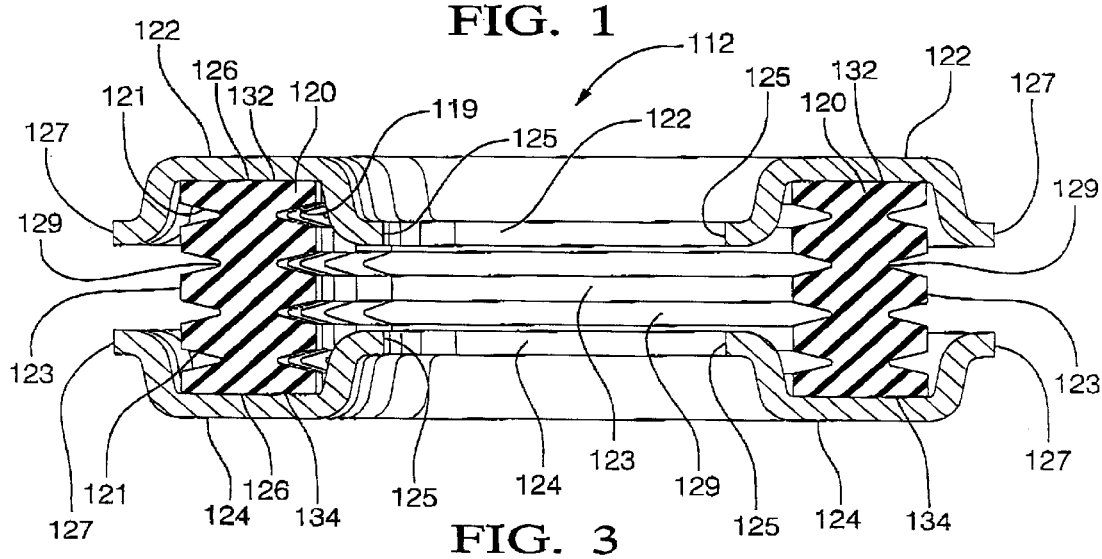
FIG. 3 is a cross-sectional view of the worm isolator assembly of FIG. 1.
Figure 2:
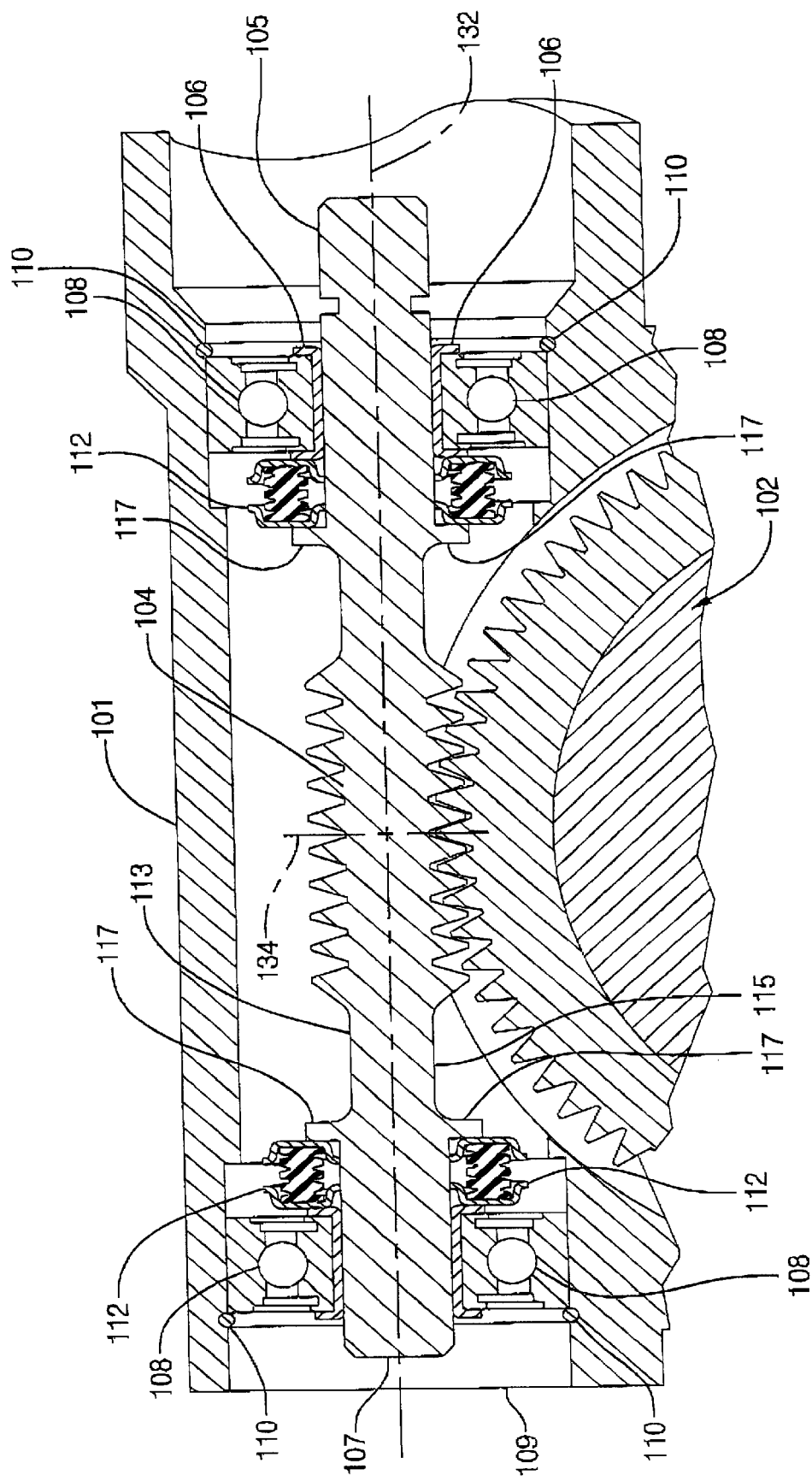
FIG. 2 is an enlarged cross-sectional view of a portion of the electric power steering assist mechanism including the worm isolator assembly of FIG. 1.
Figure 4:
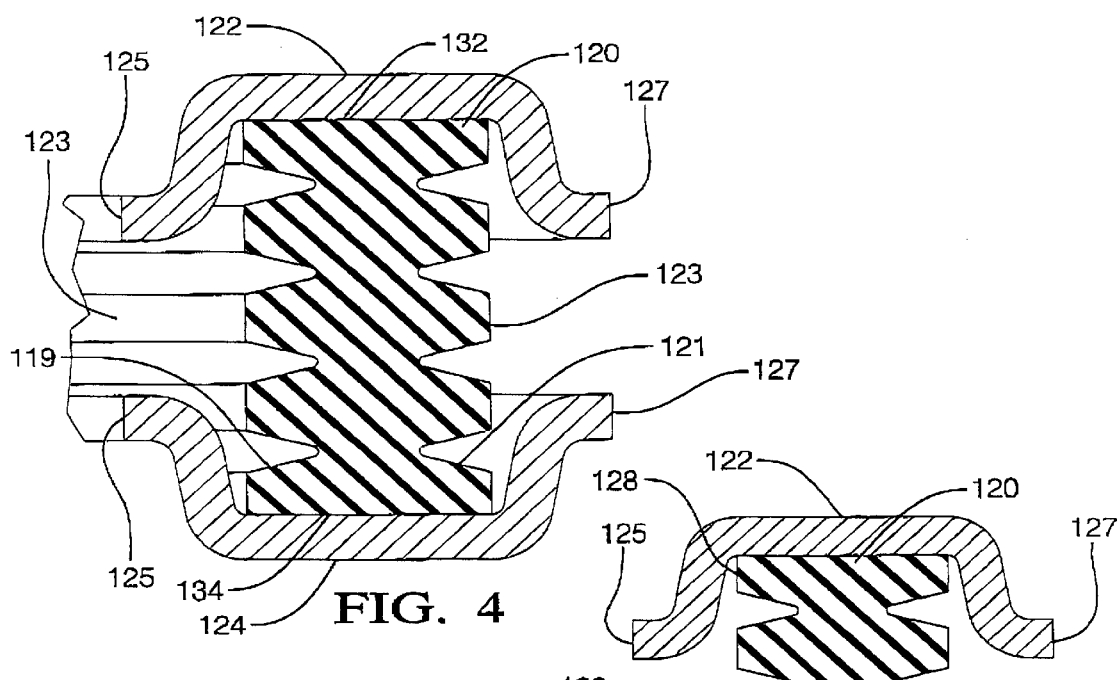
FIG. 4 is an enlarged cross-sectional view of the worm isolator assembly in area 4 in FIG. 3.

Referring now to FIGS. 2–4, in which the worm isolator assembly 112 according to the present invention is illustrated. Worm isolator assembly 112 is disposed about worm 104 on both first end 105 and second end 107. More specifically, one worm isolator assembly 112 and another worm isolator assembly 112 both seat against a first surface 113 and a second surface 115 of worm 104. In addition, worm isolator assembly 112 is disposed intermediate to ball bearing assembly 108 and annular shoulder 117 formed on the first and second surface 113, 115, respectively, of worm 104. In other words, annular shoulder 117 serves to position and locate worm isolator assembly 112 relative to ball bearing assembly 108 and worm 104.

Worm assembly 112 comprises an elastomeric member 120 and a pair of washers 122 and 124. Elastomeric member 120 also includes an inner surface 119 and an opposing outer surface 121. Elastomeric member 120 also includes a first planar surface 132 and a second planar surface 134. Formed on each of the inner and outer surfaces 119, 121 is a plurality of ridges 123, which defines a plurality of grooves 129. The design of inner and outer surfaces 119, 121 in combination with the elastomeric nature of member 120 permits member 120 to compress under pressure. The washers 122, 124 each include an annular planar section 126 with opposing flared edges 125, 127. The first planar surface 132 and the second planar surface 134 of elastomeric member 120 are received by and seat within annular planar sections 126 of washers 122, 124 and are secured between opposing flared edges 125, 127 of each washer 122, 124. Inner and outer surfaces 119, 121 of elastomeric member 120 seat within annular planar sections 126 of washers 122, 124 and are secured between opposing flared edges 125, 127 of each washer 122, 124. More specifically, flared edge 125 comprises an inner annular flared edge and flared edge 127 comprises an outer annular flared edge.

Worm isolator assembly 112, with the specific shapes of the plurality of ridges 123 and washers 122, 124 follows a prescribed load versus deflection relationship. Worm isolator assembly 1 12 maintains a desired preload along the worm axis under all operating conditions due to this relationship. This spring rate characteristic also minimizes the amplitude of the impact force between worm 104 and worm gear 102. Traditional springs do not achieve this variable spring rate throughout all operating conditions.

Figure 5A:
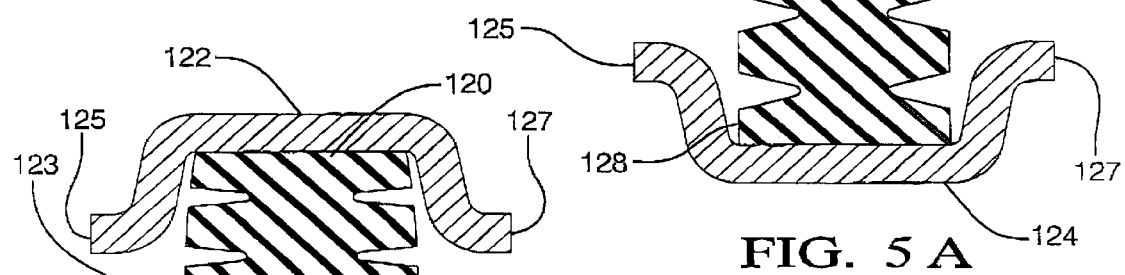
FIG. 5a is a cross-sectional view of the worm isolator assembly of FIG. 1 at a free height position.
Figure 5B:
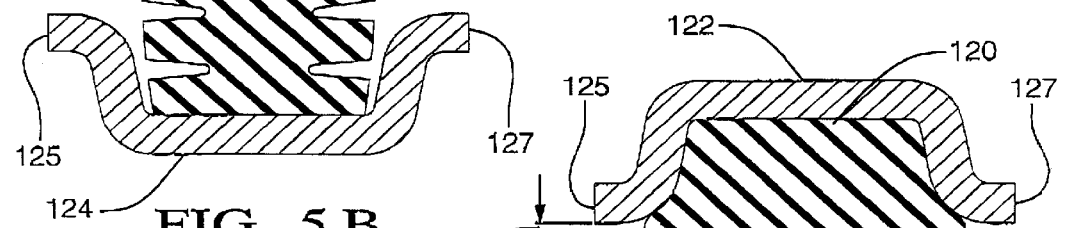
FIG. 5b nis a cross-sectional view of the worm isolator assembly of FIG. 1 at a working height position.
Figure 5C:
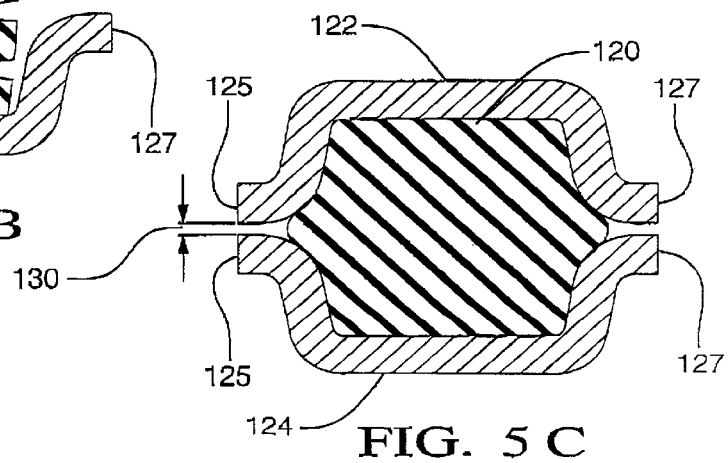
FIG. 5c is a cross-sectional view of the worm isolator assembly of FIG. 1 at a positive stop height position.

As will be further illustrated in FIGS. 5a, 5b and 5c, the shape of elastomeric member 120 is important for attaining the necessary spring constant of worm isolator assembly 112. As illustrated in FIG. 5a when worm isolator assembly 112 is at its free height, the diameter of a ridge 123 of elastomeric member 120 is less than the diameter of an inner surface 128 of washers 122, 124.

FIG. 5b depicts the worm isolator assembly at its working height. At the working height the elastomeric member 120 is in the state prior to hydrostatic compression. The ridges 123 are compressed together to form a column, which allows the assembly to maintain the desired spring rate. Further compression from the working height results in dominant hydrostatic compression. As shown in FIG. 5c when elastomeric member 120 is hydrostatically compressed within washers 122, 124, elastomeric member 120 expands and scales in shape to the confines of the shape of washers 122, 124 until reaching the point commonly known as "bottoming out" or, in the present case, the positive stop height or shut height of worm isolator assembly 112. For example, a coil spring bottoms out when the coils are compressed to the point where each coil touches the other.

In the present invention, the compression of elastomeric member 120 encapsulated within washers 122, 124 is hydrostatic. This hydrostatic compression takes place due to the encapsulation of elastomeric member 120 by washers 122, 124. The forces exerted upon elastomeric member 120 from every side are focused equally upon any single point in elastomeric member 120 so that elastomeric member 120 is not deformed or destroyed but rather scales in shape to washers 122, 124.

The positive stop height of elastomeric member 120 prevents washers 122, 124 from making contact with each other while being compressed. A clearance 130, as defined between respective flared edges 125, 127 of washers 122, 124, is formed when the positive stop height of elastomeric member 120 is reached and member 120 has expanded to its limit. This clearance 130 prevents a metal-to-metal interface from occurring, which also contributes to a reduction in noise during operation of the worm/worm gear reduction mechanism.

Referring again to FIG. 2, which illustrates how worm gear 102 meshes with the worm 104. The axis of rotation 132 of worm 104 can be seen to be generally perpendicular to the axis of rotation 134 of worm gear 102. When in operation, road feedback forces and torques or vibrational loads travel through the steering shaft 114 to the worm gear 102. These vibrational loads are transmitted through worm gear 102 to worm 104. The oscillatory impact produced takes place where worm 104 and worm gear 102 mesh. This oscillatory impact translates into axial forces acting upon worm 104. These axial forces react through worm isolator assembly 112, bushings 106, ball bearing assemblies 108, and retaining rings 1 10 to gearbox housing 101.

Worm 104 is allowed to float axially while worm isolator assembly 112 controls its axial movement. Worm isolator assembly 112 also produces a bearing preload that delashes ball bearing assembly 108. This interaction between worm 104, worm isolator assembly 112, and ball bearing assembly 108 lowers the combined stiffness of the mechanical system and delashes worm 104, bushings 106 and ball bearing assemblies 108. The end result is the reduction of audible noise by the worm/worm gear reduction mechanism.

In operation worm isolator assembly 112 is under compression and maintains an axial pre-load along axis 132 of worm 104. Any clearances within ball bearing assembly 108 and between bushings 106 and retaining rings 110 are eliminated. The elimination of these clearances, in addition to the prevention of a metal-to-metal interface, reduces the noise or "rattle" of the worm/worm gear reduction mechanism.

It will be understood that a person skilled in the art may make modifications to the preferred embodiment shown herein within the scope and intent of the claims. While the present invention has been described as carried out in a specific embodiment thereof, it is not intended to be limited thereby but is intended to cover the invention broadly within the scope and spirit of the claims.

What is claimed is:

1. An apparatus comprising;
   a gearbox housing;
   a first gear having a first axis of rotation about a first shaft;
   a second gear having a first end, a second end and a second axis of rotation about a second shaft, the first and second gears being rotatably mounted in the gearbox housing so that the first and second gears mesh with each other such that the first axis of the first gear is substantially perpendicular to the second axis of the second gear; and
   a gear isolator assembly disposed at at least one of said first end and said second end of said second gear said gear isolator including:
   an elastomeric member;
   a first washer having an annular planar section between a first washer inner flared edge and a first washer outer flared edge, the first washer disposed at a first axial end of said elastomeric member, a first width measured radially from the first washer inner flared edge to the first washer outer flared edge;
   a second washer having an annular planar section between a second washer inner flared edge and a second washer outer flared edge, the second washer disposed at a second axial end of said elastomeric member, a second width measured radially from the second washer inner flared edge to the second washer outer flared edge;
   wherein all radially measured outermost cross-sectional widths of the elastomeric member, from the first axial end to the second axial end, are less than the first width and less than the second width.

2. An apparatus recited in claim 1, wherein the first gear is a worm gear and the second gear is a worm.

3. An apparatus recited in claim 2, wherein the worm includes an annular shoulder, the gear isolator assembly being disposed between the annular shoulder and a plurality of ball bearing assemblies and a plurality of bushings.

4. An apparatus recited in claim 1, further comprising:
   a plurality of ball bearing assemblies disposed about the second gear; and
   a plurality of bushings disposed about the second gear, the ball bearing assemblies and plurality of bushings serving to support the second gear within the gearbox housing.

5. An apparatus recited in claim 4, wherein the plurality of ball bearing assemblies includes a pair of ball bearing assemblies.

6. An apparatus recited in claim 5, wherein the plurality of bushings includes a pair of bushings.

7. An apparatus recited in claim 4, wherein the plurality of ball bearing assemblies and the plurality of bushings are retained by retainer rings.

8. The apparatus recited in claim 1, wherein said elastomeric member includes an inside dimension defined by an inner surface and an outside dimension defined by an outer surface said inner surface and said outer surface being configured as a plurality of ridges which define a plurality of grooves.

9. The apparatus as recited in claim 8, wherein said ridges and said grooves extend annularly.

10. An apparatus recited in claim 1, wherein the elastomeric member is prevented from contacting the second gear by the first and second washers.

11. An apparatus comprising:
    a worm;
    a worm gear assembled with said worm;
    said a worm isolator assembly disposed at said worm;
    said worm isolator assembly including an elastomeric member, said elastomeric member having a first planar surface and an opposing second planar surface and said elastomeric member having an inner surface and an opposing outer surface, and said elastomeric member having an inner surface and an opposing outer surface, said inner surface including a plurality of ridges which define grooves and said outer surface including plurality of ridges which define grooves and said worm isolator assembly including a first washer and a second washer, said elastomeric member being disposed member being disposed between said first and said second washer, said first washer and said second washer having annular planar sections between opposing flared edges; said first planar surface seats with said first washer annular planar section and said second planar surface seats with second washer annular planar section;said plurality of ridges which define grooves of said inner surface of said elastomeric member extending continuously from one side of said worm gear to a diametrically opposite side of said worm gear. washer opposing flared edges.

12. The apparatus as in claim 11 wherein said elastomeric member is homogeneous in composition.

13. An apparatus recited in claim 12 wherein there is nothing between the first washer and the second washer except for the elastomeric member.

14. The apparatus as in claim 11 wherein said first washer and said second washer are prevented from making contact with each other by said elastomeric member.

15. The apparatus as in claim 11 wherein said first washer comprises a first washer inner flared and a first washer outer flared edge and said second washer comprises a second washer inner flared edge and a second washer outer flared ridge, wherein an empty space extends from the first washer inner flared edge to the second washer inner flared edge and an empty space extends from the first washer from one side of said worm gear to a diametrically opposite side of said worm. second washer maintain a clearance between the opposing flared edges, said clearance being devoid of materials.

16. The apparatus as in claim 11 wherein said worm isolator maintains a preload along an axis of the worm under all operating conditions.

17. The apparatus as in claim 11 wherein said first washer and said second washer are ridgid.

18. An apparatus recited in claim 11 wherein the first washer and the second washer house only one of said elastomeric member therebetween.

19. An apparatus comprising;

a first gear having a first axis of rotation about a first shaft;

a second gear having a first end, a second end and a second axis of rotation about a second shaft, the first and second gears being rotatably mounted so that the first and second gears mesh with each other such that the first axis of the first gear is substantially perpendicular to the second axis of the second gear; and a gear isolator assembly disposed at at least one of said first end and said second end of said second gear said gear isolator including:

an elastomeric member;

a first washer having an annular planar section between a first washer inner flared edge and a first washer outer flared edge, disposed at a first axial end of said elastomeric member;

a second washer having an annular planar section between a second washer inner flared edge and a second washer outer flared edge, disposed at a second axial end of said elastomeric member;

wherein an empty space extends from the first washer inner flared edge to the second washer inner flared edge and an empty space extends from the first washer outer flared edge to the second washer outer flared edge.

* * * * *